Sept. 3, 1940.　　　　　C. O. MARSHALL　　　　　2,213,587
WEIGHING SCALE
Filed Nov. 12, 1937　　　　3 Sheets-Sheet 1
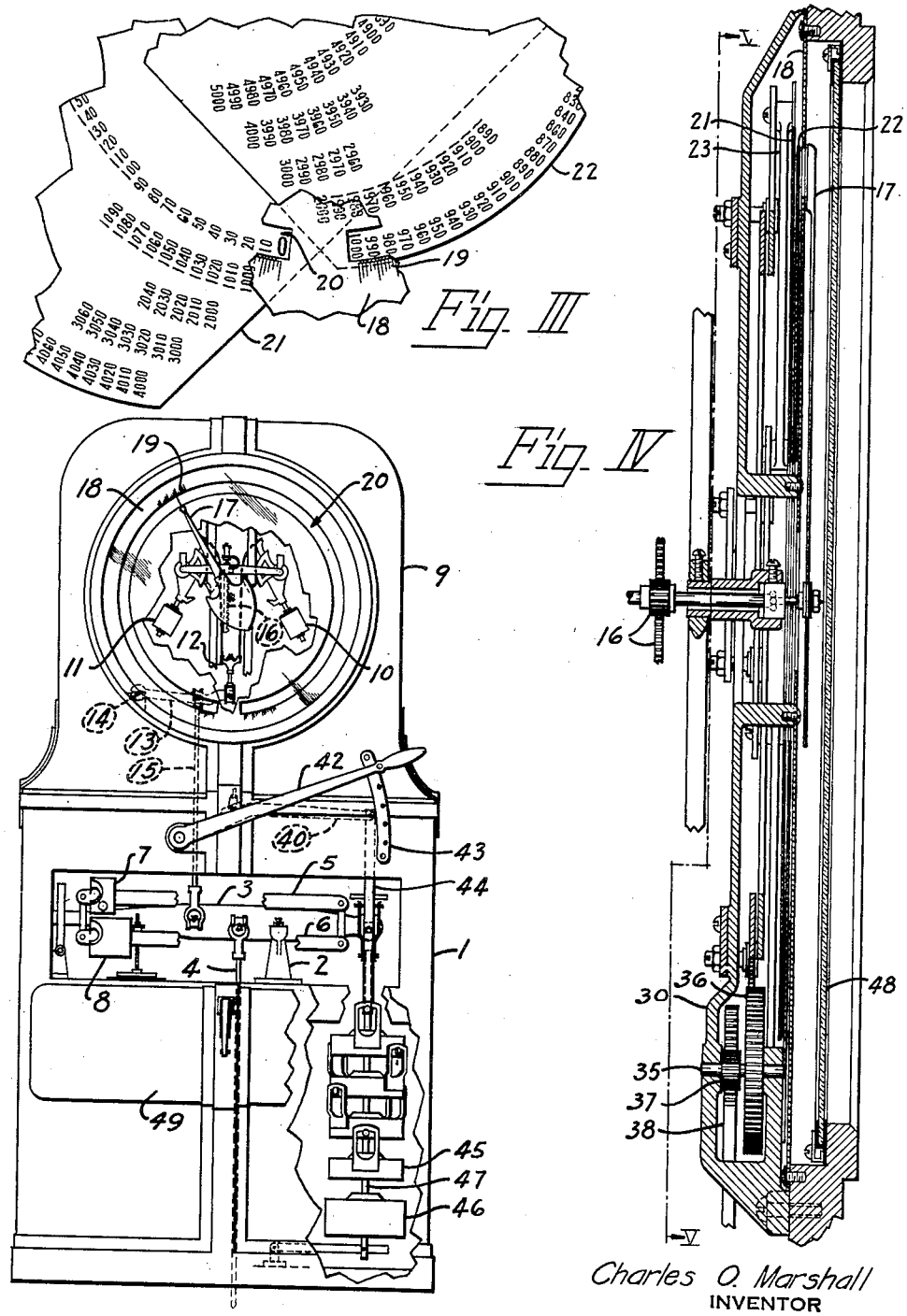
Charles O. Marshall
INVENTOR
BY Marshall & Marshall
ATTORNEYS

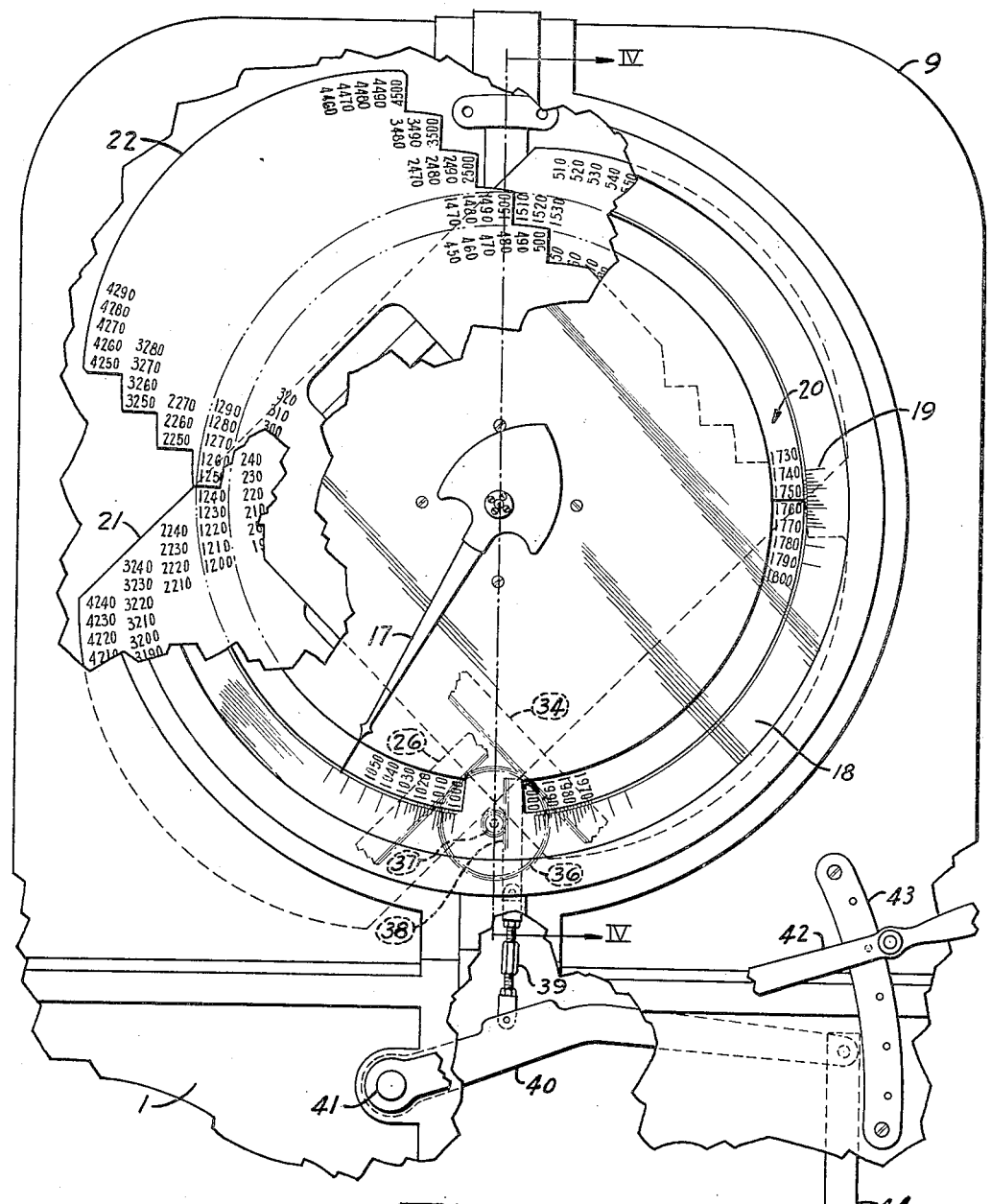

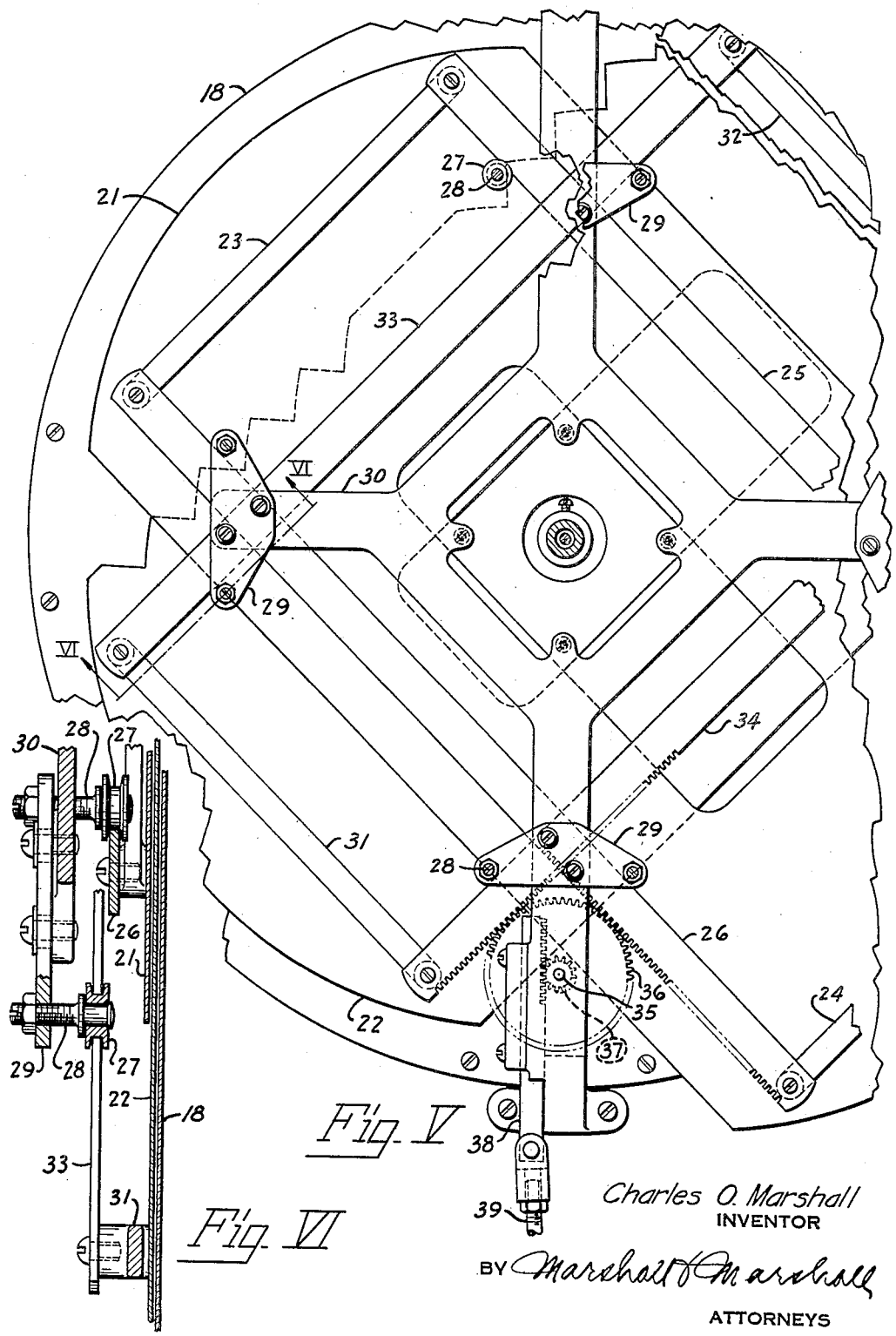

Patented Sept. 3, 1940

2,213,587

UNITED STATES PATENT OFFICE 2,213,587

WEIGHING SCALE

Charles O. Marshall, Toledo, Ohio, assignor to Toledo Scale Company, Toledo, Ohio, a corporation of New Jersey Application November 12, 1937, Serial No. 174,269

6 Claims. (Cl. 265—48)

This invention relates to automatic weighing scales having capacity-increasing mechanism and its principal object is the provision of improved means for changing dial indicia to correspond to the condition of the capacity-increasing mechanism.

Another object is the provision of improved means for changing all of the numerals throughout the range of a circular dial.

Another object is the provision of a dial with a continuous window extending through a nearly complete circle, and a plurality of series of numerals, which series are selectively rendered visible through the continuous window.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevational view of a scale head embodying my invention, parts being broken away to expose load-counterbalancing mechanism and connections;

Figure II is an enlarged front elevational view of the dial of the scale illustrated in Figure I, parts being broken away to expose parts of numeral-bearing plates;

Figure III is a similarly enlarged fragmentary view showing other parts of the numeral plates;

Figure IV is a further enlarged fragmentary sectional view, taken on the line IV—IV of Figure II;

Figure V is an enlarged rear elevational view showing plate shifting mechanism; and Figure VI is a further enlarged fragmentary sectional view, taken on the line VI—VI of Figure V.

Referring to the drawings in detail, the mechanism is shown as embodied in the head of a scale of the general type illustrated and described in United States Patent No. 1,423,660 issued upon the application of Halvor O. Hem.

The scale head consists of a cabinet 1 within which is supported a fulcrum stand 2 upon which a beam lever 3 is fulcrumed. The beam lever 3 is connected, by means of a rod 4, to load-supporting levers (not shown). The beam lever 3 carries beams 5 and 6 upon which are mounted slidable poises 7 and 8 to offset the weight of trucks and containers.

Surmounting the cabinet 1 is a dial housing 9 within which is supported a pair of automatic load-counterbalancing pendulums 10 and 11.

The automatic load-counterbalancing pendulums are connected, by means of connections 12, to a lever 13 which is fulcrumed at 14 within the dial housing 9, and the lever 13 is connected, by means of a link 15, to the beam lever 3. Movement of the automatic load-counterbalancing pendulums 10 and 11 is transmitted, by means of a rack and pinion mechanism 16, to an indicating pointer 17 which, when a load is placed upon the scale, swings in a clockwise direction over a chart 18 which is marked with a circular series of graduations 19.

Located inside the circular series of graduations 19 is a nearly completely annular opening 20 and behind the chart 18 are located slidably mounted numeral-bearing plates 21 and 22, the plate 21 being fastened to crossbars 23 and 24 which, in turn, are secured to a guide bar 25 and a rack bar 26, the guide bar 25 and rack bar 26 being mounted for endwise movement on flanged rollers 27 and the rollers 27 being rotatably mounted on studs 28 secured to brackets 29 which are fastened to a frame 30 that is supported within the dial housing 9. Similarly, numeral bearing plate 22 is fastened to crossbars 31 and 32 which, in turn, are secured to a guide bar 33 and a rack bar 34, the guide bar 33 and rack bar 34 being mounted for endwise movement on the flanged rollers 27.

Journaled in the frame 30 is a shaft 35 upon which is fixed a large pinion 36 that meshes with teeth in the rack bars 26 and 34. Also fixed upon the shaft 35 is a small pinion 37 that meshes with teeth in a rack 38 which is connected, by means of a link 39, to a capacity-increasing counterpoise-supporting arm 40. The capacity-increasing counterpoise-supporting arm 40 is fixed upon a rockshaft 41 which extends forwardly through the wall of the cabinet 1, and upon the exterior end of the rockshaft 41 is mounted a handle 42 which may be set in any of five positions along an arcuate retaining bar 43.

Depending from the end of the arm 40 is a link 44 which supports a chain of four capacity-increasing counterpoises 45. When the handle 42 is lowered, the capacity-increasing counterpoises 45 are deposited one after another upon a poise pan 46 which hangs, by means of a rod 47, from the end of the beam lever 3.

When the handle 42 is in the position in which it is shown in Figure I the numeral-bearing plates 21 and 22 are in the positions in which they are shown in Figure III. The numeral-bearing plate 21 bears an arcuate series of numerals ranging from zero to 240 and an arcuate series of numerals ranging from 510 to 750, which, when the numeral-bearing plate 21 is in the position in which it is shown in Figure III, are visible through the opening 20; and the numeral-bearing plate 22 bears an arcuate series of numerals ranging from 250 to 500 and an arcuate series of numerals ranging from 760 to 1000, which, when the numeral-bearing plate 22 is in the position in which it is shown in Figure III, are visible through the opening 20. With the numeral-bearing plates 21 and 22 in the position in which they are shown in Figure III, the numerals on the plates form a continuous visible series ranging from zero to 1000 and serving to evaluate the adjacent graduations 19 on the chart 20.

When the handle 42 is moved into the position in which it is shown in Figure II, the lever 40, link 39 and the rack 38 are pulled downward, thus turning the pinions 37 and 36 and moving the rack bar 26 with the numeral-bearing plate 21 upwardly and to the right and the rack bar 34 with the numeral-bearing plate 22 downwardly and to the right to the position in which they are shown in Figure II. The numeral-bearing plates 21 and 22 bear arcuate series of numerals which, in this position, form a continuous series, ranging from 1000 to 2000, which are visible through the opening 20 and evaluate the graduations 19 on the chart 18. In this position of the handle 42 and the numeral-bearing plates 21 and 22, the lowermost capacity-increasing counterpoise 45 is deposited upon the poise pan 46 and hence serves to counterbalance 1000 lbs. of the load on the scale, the remainder of the load being counterbalanced by the automatic load-counterbalancing pendulums 10 and 11, which, as they move to load-counterbalancing position, cause the indicating pointer 17 to swing in a clockwise direction and indicate the proper graduation 19, evaluated by an appropriate numeral visible through the opening 20.

Movement of the handle 42 into its next lowermost position along the arcuate retaining bar 43 brings a series of numerals ranging from 2000 to 3000 into visibility through the opening 20 and deposits a second capacity-increasing counterpoise. Still further downward movement of the handle brings series of numerals ranging from 3000 to 4000 into visibility through the opening 20 and deposits the third capacity-increasing counterpoise, while movement of the handle to its lowermost position brings a series of numerals ranging from 4000 to 5000 into visibility through the opening 20 and deposits the fourth capacity-increasing counterpoise on the poise pan 46.

The indicating hand and dial are covered by a transparent sheet of glass 48 and the beams 5 and 6 and poises 7 and 8 may be covered, when desired, by a door 49.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, lever mechanism, automatic load-counterbalancing mechanism connected to said lever mechanism, a series of capacity-increasing poises, means for successively depositing said capacity-increasing poises upon said lever mechanism, a pointer connected to said automatic load-counterbalancing mechanism and revoluble through nearly a complete revolution, a chart bearing graduations to be indicated by said pointer, there being a curved opening extending through nearly a complete circle adjacent said graduations, a pair of plates located immediately behind said chart, one of said plates bearing a plurality of series of numerals to evaluate the graduations along the first and third quarters of said opening, the other of said plates bearing a plurality of series of numerals to evaluate the graduations along the second and fourth quarters of said opening, certain of the series of numerals on one of said plates cooperating with certain of the series of numerals on the other of said plates to form continuous series of numerals evaluating the graduations along all four quarters of said opening, one of the continuous series thus formed ranging from zero to a numeral corresponding to the weighing capacity of the automatic load-counterbalancing mechanism and the other continuous series thus formed ranging respectively from a numeral corresponding to the weighing capacity of one or more of the capacity-increasing poises to the total weighing capacity of such capacity-increasing poises plus the weighing capacity of the automatic load-counterbalancing mechanism, and means connected to said capacity-increasing poise-depositing means to shift said plates in directions perpendicular to each other and radially of said chart and thereby make visible through said opening series of numerals corresponding to the various weights of loads capable of being counterbalanced by the capacity-increasing poises acting with the load-counterbalancing mechanism.

2. In a weighing scale, in combination, lever mechanism, automatic load-counterbalancing mechanism connected to said lever mechanism, a series of capacity-increasing poises, means for depositing said capacity-increasing poises upon said lever mechanism, a pointer connected to said automatic load-counterbalancing mechanism and revoluble through nearly a complete revolution, a chart bearing graduations to be indicated by said pointer, there being a curved opening extending through nearly a complete circle adjacent said graduations, a pair of numeral-bearing plates located immediately behind said chart, certain of the numerals on one of said plates cooperating with the numerals on the other of said plates to form continuous series of numerals evaluating the graduations along said opening, one of the continuous series thus formed ranging from zero to a numeral corresponding to the weighing capacity of the automatic load-counterbalancing mechanism and the other continuous series thus formed ranging respectively from a numeral corresponding to the weighing capacity of one or more of the capacity-increasing poises to the total weighing capacity plus the weighing capacity of the automatic load-counterbalancing mechanism, and means connected to said capacity-increasing poise-depositing means to shift said plates simultaneously in directions perpendicular to each other and radially of said chart and thereby make visible through said opening series of numerals corresponding to the various weights of loads capable of being counterbalanced by the capacity-increasing poises acting with the automatic load-counterbalancing mechanism.

3. In a weighing scale, in combination, lever mechanism, automatic load-counterbalancing mechanism connected to said lever mechanism, a plurality of capacity-increasing poises, means for depositing said capacity-increasing poises upon said lever mechanism, a pointer connected to said automatic load-counterbalancing mechanism and revoluble through nearly a complete revolution, a chart bearing graduations to be indicated by said pointer, there being a curved opening extending through a nearly complete circle adjacent said graduations, a plurality of numeral-bearing plates located immediately behind said chart, certain of the numerals on said plates cooperating to form continuous series of numerals evaluating the graduations along said opening, one of the continuous series thus formed ranging from zero to a numeral corresponding to the weighing capacity of the automatic load-counterbalancing mechanism and the other continuous series thus formed ranging respectively from numerals corresponding to the weighing capacity of one or more of the capacity-increasing poises to numerals corresponding to the total weighing capacity of such capacity-increasing poises plus the weighing capacity of the automatic load-counterbalancing mechanism, and means connected to said capacity-increasing poise-depositing means to shift said plates and thereby make visible through said opening series of numerals corresponding to the various loads capable of being counterbalanced by the capacity-increasing poises acting with the automatic load-counterbalancing mechanism.

4. In a weighing scale, in combination, lever mechanism, automatic load-counterbalancing mechanism connected to said lever mechanism, a series of capacity-increasing poises, means for depositing said capacity-increasing poises upon said lever mechanism, a pointer connected to said automatic load-counterbalancing mechanism and revoluble through nearly a complete revolution, said pointer being swingable over a curved opening extending through nearly a complete circle, a plurality of plates located immediately behind said opening, one of said plates bearing a plurality of series of indicia to evaluate weights indicated by said pointer during the first and third quarters of its revoluble movement, the other of said plates bearing a plurality of series of indicia to evaluate weights indicated by said pointer during the second and fourth quarters of its revoluble movement, certain of the numerals on one of said plates cooperating with certain of the numerals on the other of said plates to form continuous series of numerals evaluating the weights to be indicated by said pointer throughout its revoluble movement, one of the continuous series thus formed ranging from zero to an indicium corresponding to the weighing capacity of the automatic load-counterbalancing mechanism and the other continuous series thus formed ranging respectively from indicia corresponding to the weighing capacity of one or more of the capacity-increasing poises to the weighing capacity of such capacity-increasing poises plus the weighing capacity of the automatic load-counterbalancing mechanism, and means connected to said capacity-increasing poise-depositing means to shift said plates and thereby make visible through said opening series of indicia corresponding to the various weights of loads capable of being counterbalanced by the capacity-increasing poises acting with the automatic load-counterbalancing mechanism.

5. In a weighing scale, in combination, lever mechanism, automatic load-counterbalancing mechanism connected to said lever mechanism, a series of capacity-increasing poises, means for depositing said capacity-increasing poises upon said lever mechanism, a pointer connected to said automatic load-counterbalancing mechanism and revoluble through more than two thirds of a complete revolution when said automatic load-counterbalancing mechanism moves from no load position to its maximum load position, a chart bearing graduations to be indicated by said pointer, a plurality of surfaces associated with said graduations each of said surfaces bearing a plurality of series of numerals to evaluate the graduations, and said surfaces being movable to bring each of said series of numerals selectively into a position adjacent the graduations to evaluate them, the portions of said surfaces that bear corresponding series of numerals being substantially contiguous when positioned adjacent the graduations, thus presenting an uninterrupted sequence of numerals for evaluating the graduations, each such sequence of numerals corresponding to loads capable of being weighed by one or more of said capacity-increasing poises acting in conjunction with the automatic load-counterbalancing mechanism, and means connected to said capacity-increasing poise-depositing means to move said plurality of surfaces and thereby make visible series of numerals extending in uninterrupted sequence throughout more than two-thirds of a complete circle traversed by said pointer and corresponding to the various weights of loads capable of being counterbalanced by the capacity-increasing poises acting with the automatic load-counterbalancing mechanism.

6. In a weighing scale, in combination, lever mechanism, automatic load-counterbalancing mechanism connected to said lever mechanism, a plurality of capacity-increasing poises, means for depositing said capacity-increasing poises upon said lever mechanism, a pointer connected to said automatic load-counterbalancing mechanism and revoluble through more than two-thirds of a complete revolution when said automatic load-counterbalancing mechanism moves from no load position to its maximum load position, a plurality of surfaces bearing series of indicia, said surfaces being movable to bring corresponding series of indicia on all the surfaces selectively into alinement along the more than two-thirds of a circle traversed by the pointer, the portions of said surfaces that bear corresponding series of indicia being substantially contiguous when the corresponding series of indicia are brought into alinement, thus presenting an uninterrupted sequence of indicia, each such sequence of indicia corresponding to loads capable of being weighed by one or more of said capacity-increasing poises and said automatic load-counterbalancing mechanism acting together, and means for selectively depositing one or more of said capacity-increasing poises upon said lever mechanism and simultaneously moving said plurality of surfaces and thereby bringing the proper series of corresponding indicia into alinement along the more than two-thirds of a complete circle traversed by said pointer.

CHARLES O. MARSHALL.